May 16, 1933.  F. A. NILSSON  1,909,626
GEAR CASING
Filed Dec. 11, 1931
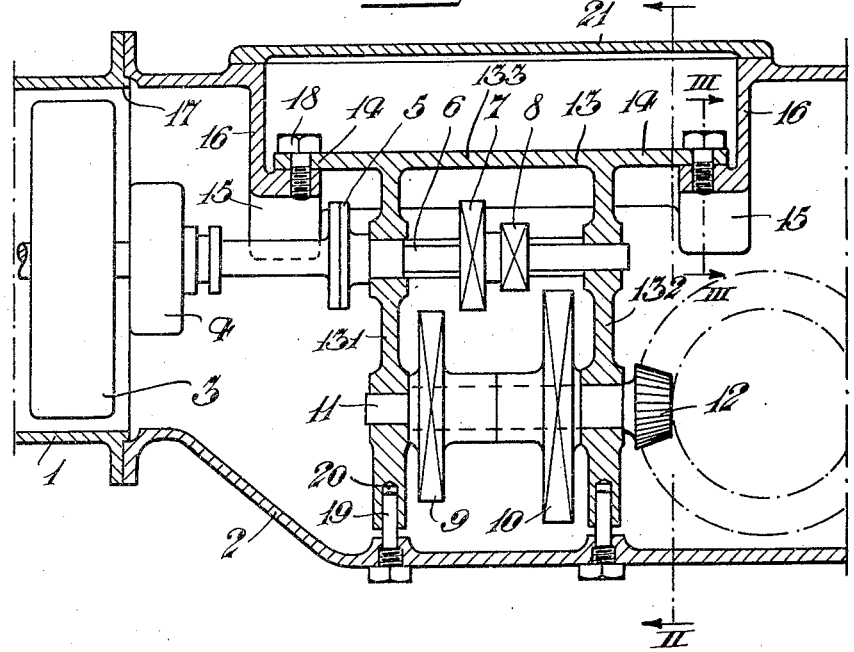
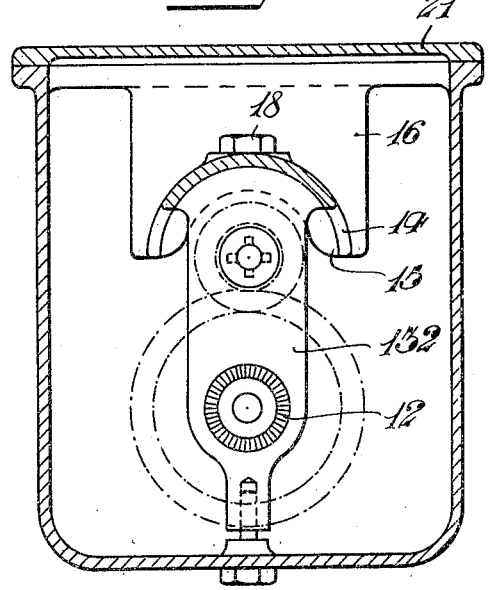
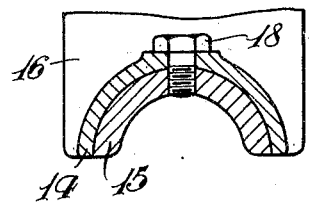
Inventor,
Fritz Albert Nilsson
By Sommers & Young
Attys.

Patented May 16, 1933

1,909,626

UNITED STATES PATENT OFFICE

FRITZ ALBERT NILSSON, OF JONKOPING, SWEDEN

GEAR CASING

Application filed December 11, 1931, Serial No. 580,404, and in Sweden November 25, 1930.

This invention relates to improvements in change speed gears for motor vehicles, especially tractors, having two or more parallel shafts supporting the gear wheels, one of said shafts being adapted to be in alignment with the driving shaft and to be connected therewith.

The chief object of the invention is to provide means whereby in a simple manner an exact alignment of the driving shaft and of the gear shaft to be connected therewith can be attained so as to avoid jamming of the shafts in their bearings and heating of the latter caused by such jamming.

A further object of the invention is to facilitate the mounting and dismounting of the shafts and gear wheels of the change speed gear.

The invention consists, chiefly, in this that the shafts and gear wheels of the device are mounted in a separate support or frame having cylindrical, conical or similar bearing surfaces formed as surfaces of revolution the axis of which coincides with the axis of the gear shaft to be connected with the driving shaft, said bearing surfaces engaging supporting surfaces in the housing of the device having the form of similar surfaces of revolution the axis of which is in alignment with the axis of the driving shaft. To facilitate the removal of said support or frame together with its shafts and gear wheels in a direction at right angles to the axis of the supporting surfaces, an opening normally closed by a detachable cover is provided in the wall of the gear housing.

In the accompanying drawing I have shown one embodiment of my invention in connection with a change speed gear of a tractor. Fig. 1 is a vertical longitudinal section of the change speed gear, Fig. 2 is a section on the line II—II in Fig. 1 and Fig. 3 is a section on the line III—III in Fig. 1.

Referring to the drawing, 1 is the rear portion of the crank case of the motor and 2 is the housing of the change speed gear, the rear portion of said housing being broken away. 3 is the flywheel of the motor and 4 is a friction clutch coupling by means of which the motor shaft can be connected with or disconnected from the speed change gear in well-known manner. The one part of said friction clutch coupling is by means of a flange coupling connected with the upper gear shaft 6 which is in alignment with the motor shaft. On the gear shaft 6 two gear wheels 7 and 8 are mounted so as to be axially movable but not rotatable thereon, said wheels being shown in the drawing in idle position. By a coupling lever or equivalent means not shown in the drawing said wheels may alternately be brought into engagement with two gear wheels 9 and 10 respectively mounted on the lower gear shaft 11 so as to drive said latter shaft with different speeds. The gear shaft 11 is by means of a differential gear indicated at 12 connected with the driving wheels of the tractor.

The gear shafts 6 and 11 together with their gear wheels 7, 8 and 9, 10 respectively are journalled in a separate support or frame 13 consisting of two vertical plates 131, 132 interconnected by an upper transversal beam 133 having, preferably, an arched cross-section as is shown in Fig. 2. The beam 133 is extended over the vertical plates 131, 132 so as to form flanges 14 which, preferably, have such width that they are substantially semi-circular in cross-section. Said flanges are on the inside well dressed so as to form cylindrical bearing surfaces the axis of which coincides with the axis of the gear shaft 6.

The support or frame 13 bears by means of said flanges 14 on corresponding flanges 15 in the housing 2. The latter are on the outer side provided with smoothed cylindrical surfaces corresponding to the cylindrical surfaces on the flanges of the frame 13 and having their axis in alignment with the axis of the motor shaft. The centering of the housing of the change speed gear in relation to the crank case is effected by means of the ring-shaped shoulder 17. The flanges 15 in the housing of the device have a semi-circular cross-section, as is shown in Fig. 3, and are provided on intermediate walls 16 extending downwards from the upper wall of the housing 2 on each side of an opening in said wall, said opening having a size allowing the frame 13 together with the gear shafts to be inserted in the housing or taken out therefrom through said opening. The said opening is normally closed by a cover 21.

The frame 13 is rigidly secured in the housing 2 by means of screw bolts 18 passing through the flanges 14, 15. In order to guide the frame when it is inserted into the housing 2 so that it immediately comes in the desired position guiding pins 19 are provided in the bottom wall of the housing, said pins being adapted to engage borings 20 in the frame. The pins may, of course, also be secured to the frame and the borings be made in the housing.

In mounting the frame 13 in the housing 2 it is inserted through the opening of the housing in such manner that the guiding pins 19 engage the borings 20 and the flanges 14 rest on the flanges 15. The frame is then secured by means of the screw bolts 18 and the upper gear shaft 6 is connected with the driving shaft by means of the flange coupling 5. The opening is then closed by means of the cover 21.

The number of gear shafts and gear wheels mounted in the detachable frame as well as the construction of the latter may be varied after the circumstances. For the cylindrical bearing surfaces above described bearing surfaces having another form, as for instance conical, double-conical or spherical bearing surfaces may be used, provided that they are coaxial with the gear shaft to be connected with the driving shaft.

What I claim is:—

1. A casing for change speed gears for motor vehicles, comprising a housing having semi-cylindrical flanges in the interior of the casing, forming convex supporting surfaces, and a gear shaft support detachably mounted in the housing and having concave semi-cylindrical bearing surfaces fitted to the supporting surfaces of the housing, said support containing journals for a gear shaft the axis of which coincides with the axis of the semi-cylindrical bearing surfaces.

2. A casing as described in claim 1, in which the housing has an opening in the upper side, downwardly extending walls in the housing at opposite ends of said opening, said walls being provided with semi-cylindrical flanges adapted to support the gear shaft support in such position that the latter can be removed from the housing through said opening.

In testimony whereof I have signed my name.

FRITZ ALBERT NILSSON.